(12) United States Patent
Thompson et al.

(10) Patent No.: US 7,591,719 B1
(45) Date of Patent: Sep. 22, 2009

(54) RETAINER FOR POULTRY HOCKS

(75) Inventors: Gary M. Thompson, Turlock, CA (US); Daniel J. Volk, Cumming, GA (US)

(73) Assignee: Volk Enterprises, Inc., Turlock, CA (US)

( * ) Notice: Subject to any disclaimer, the term of this patent is extended or adjusted under 35 U.S.C. 154(b) by 0 days.

(21) Appl. No.: 12/126,403

(22) Filed: May 23, 2008

(51) Int. Cl.
*A22C 25/00* (2006.01)
(52) U.S. Cl. ...................................... 452/174
(58) Field of Classification Search ............. 452/11, 452/172, 174, 176, 198; 383/71; 206/340
See application file for complete search history.

(56) References Cited

U.S. PATENT DOCUMENTS

| | | | | |
|---|---|---|---|---|
| 4,739,538 A | * | 4/1988 | Volk | 452/174 |
| 5,102,370 A | * | 4/1992 | Volk | 452/174 |
| 5,112,274 A | * | 5/1992 | Volk | 452/174 |
| 5,181,880 A | * | 1/1993 | Volk | 452/174 |
| 5,498,201 A | * | 3/1996 | Volk | 452/174 |
| 5,735,736 A | * | 4/1998 | Volk | 452/176 |
| 5,749,778 A | * | 5/1998 | Volk | 452/174 |
| 7,014,553 B1 | * | 3/2006 | Volk | 452/174 |
| 7,175,518 B2 | * | 2/2007 | Volk | 452/174 |

\* cited by examiner

*Primary Examiner*—Thomas Price
(74) *Attorney, Agent, or Firm*—Laurence P. Coltron; Smith, Gambrell & Russell (57) ABSTRACT

A device for retaining and trussing the hocks of poultry carcass in juxtaposition and proximal to the carcass during processing, packaging, shipping, storage, and/or cooking. The present invention, including hock retaining members, can be constructed of a unitary, plate-like member of resilient material and can include two openings for fitting about and retaining the hocks, an anchor to be affixed to the carcass, and a connecting means between the hock retaining members and the anchor. The connecting members provide a spring force to keep the hocks and thus the legs juxtaposed to the carcass and each other.

13 Claims, 4 Drawing Sheets

Fig_5

Fig_6

RETAINER FOR POULTRY HOCKS

BACKGROUND OF THE INVENTION

1. Technical Field

The present invention relates generally to a device for trussing or retaining the hocks of poultry carcasses and more particularly to a retainer that can engage the hocks of a poultry carcass to retain the legs in juxtaposition during processing, packaging, shipping and possibly cooking.

2. Prior Art

As appreciated by those skilled in the art, the processing, packaging and shipping of poultry carcasses can be made easier by creating relative uniformity amongst trussed poultry carcasses. For example, if the hocks of poultry carcasses are protruding from the animal carcass, then the extending limbs can interfere with packaging machinery and tear the packaging material, which often is a thin polymer. Trussing the hocks, thereby holding the legs together close to the body, can help to avoid this problem. Additionally, trussing draws the poultry legs back and creates a visual impression that the poultry breast is larger, and therefore makes the trussed poultry more appealing to the purchaser. Further, it is easier to cook a trussed poultry carcass, especially on a rotisserie, as the legs will be retained against the body and not flop about. Similarly, as the poultry carcasses can be cooked more easily, there is an added benefit of trussing poultry carcasses to consumers, and this can be exploited by advertising by the retailer.

Over the years, many brackets, clamps, retainers, and similar devices have been developed for retaining or trussing the hocks of poultry carcasses during cooking, shipping, and processing, some in the past of metal and wire, but most recently of nylon or plastic. Not surprisingly, the prior art discloses many means for trussing the hocks of poultry carcasses. While the known prior art has advantages for certain situations, there is a constant need for poultry trussing devices that are less expensive to manufacture, are easier to mount on the hocks, are easier to dismount from the hocks, are less costly to ship, that hold the hocks more securely, and that can be mounted automatically if desired, or combinations of these. A few exemplary trussing devices are discussed below.

U.S. Pat. No. 4,739,538 to Volk discloses a retainer for poultry hocks having a central locking member cooperating with straps for positively securing poultry legs tightly against each of the hocks, together with anchors into kidney openings in the poultry backbone. U.S. Pat. No. 5,102,370 to Volk discloses a hock cap covering the entire hock wherein such a hock cap has a FIG. 8 structure with an ankle strap having a lower portion that engages the back side of the ankles. U.S. Pat. No. 5,112,274 to Volk discloses a snap-on ankle strap poultry-trussing device having a lower portion with an indent that extends upwardly between the exposed hocks of the carcass. The ankle strap is slipped over the exposed hocks, grasps the ankles of the poultry carcass, and holds them together. U.S. Pat. No. 5,181,880 to Volk discloses a method of trussing poultry by making slits in the skin and passing the hocks through the slits and then attaching a snap-on hock cap to hold the hocks together.

U.S. Pat. No. 5,498,201 to Volk discloses a retainer for poultry hocks that is formed as an oblong ring of a thin unitary plastic. The ring has a plurality of prong portions extending inward. The poultry hocks are inserted through the ring and the prongs engage the poultry legs so as to hold the hocks in juxtaposition. U.S. Pat. No. 5,735,736 to Volk discloses a retainer for poultry hocks that is formed as an oblong ring of a thin unitary plastic. The ring has a plurality of prong portions extending inward. The poultry hocks are inserted through the ring and the prongs engage the poultry legs so as to hold the legs substantially perpendicular to the retainer and parallel to each other. U.S. Pat. No. 5,749,778 to Volk discloses a retainer for poultry hocks that is formed as a ring of a thin unitary plastic material and has hinged flaps extending inward from opposite sides thereof. The poultry hocks are inserted through the ring to cause the flaps to bend outward and then to partially retract backward so that the edges of the flaps engage behind the hock knuckles, holding the thighs close to the body of the fowl. U.S. Pat. No. 7,175,518 to Volk discloses a retainer for poultry hocks that is formed as a unitary, plate-like member of resilient material that includes two openings for fitting over the hocks.

U.S. Pat. No. 7,014,553 discloses a device for retaining and trussing the hocks of poultry carcass in juxtaposition and proximal to the body during processing, packaging, shipping, storage, and/or cooking. The device may be constructed of a unitary, plate-like member of resilient material and includes two openings for fitting about and retaining the hocks, an anchor to be affixed to the poultry carcass, and a connecting means between the hock retaining members and the anchor. The connecting members provide a spring force to keep the hocks and thus the legs juxtaposed to the carcass and each other.

Thus, there is always a need for a hock retainer generally for trussing poultry carcasses and specifically for fitting about the hocks so as to hold the legs proximal to each other and to the body of the carcass. There also is always a need for a relatively simple device that can be manufactured simply and inexpensively, and easily is mounted on and dismounted from the hocks. There additionally is always a need for a hock retainer that is less labor-intensive to attach to the poultry and allows more throughput per worker. There further always is a need for a hock retainer that has less interaction or contact with packaging materials. It is to these needs and others that the present invention is directed.

BRIEF SUMMARY OF THE INVENTION

Briefly described, the present invention is a device for retaining and trussing the hocks of an eviscerated poultry carcass in juxtaposition to each other and proximal to the body during processing, packaging, shipping, storage, and/or cooking. The retainer of the present invention may be constructed as a unitary, plate-like member of resilient material. The retainer includes a bridle having a resiliently flexible upper member connected at opposed ends to a lower semi-rigid spar, with a separator interconnecting the upper member and the spar at midpoints thereof. The upper member, spar, and separator define a pair of receiving openings or loops adapted to receive the hocks of the poultry legs. The retainer is preferably secured to the poultry carcass by an anchor having upturned ends that are adapted for engagement within the interior cavity of the poultry carcass. The anchor is connected in a depending relation to the bridle by extensible legs.

Each loop comprises a extensible resilient strap that extends in a serpentine manner across the loop and has a first attachment to the upper member and a second attachment to the spar. The straps are adapted to engage a cleft or crease between the knuckle-shaped end of the leg bone at the hock. Preferably, each loop further comprises a tab projecting inwardly from the upper member into the loop opening for guiding the leg ends into engagement with the resilient straps and for preventing the leg ends from extending through the loops. The tab is located at the outer periphery of the respective loop so that the leg ends are guided inwardly. The tab passes over the hock knuckle and comes to rest behind the hock knuckle at the ankle so as to retain the hock more securely within the loop and to create and complete a generally basket-like structure out of the loop and resilient strap when properly on the hock.

An appendage, preferably a ring, is disposed in depending relationship to the spar for permitting manipulation of the retainer. More specifically, the appendage provides a lever for pivoting the bridle relative to the extensible legs and the anchor. In use, after the anchor is inserted into the poultry's cavity and anchored, the user grasps the appendage and pulls upwardly (generally away from) relative to the bird, thus rotating the bridle up to approximately 180 degrees, the hocks are placed in the bridle such that the resilient straps cooperate with the creases in the knuckles of the hocks, and the bridle is released. The bridle attempts to return (rotate back) to its original position due to the elasticity of the material of construction, thus locking the hocks with the bridle. The resilient straps fit in the knuckle crease, the outer portions of the bridle fit over the hocks, the separator fits between the ankles, and the tabs fit behind the hock knuckles at the ankles, thus helping to secure the hocks.

The structure of the present invention increases the ease of attaching the invention to the bird and reduces the number of incorrect applications, thus increasing the throughput of birds per worker. For example, placement of the separator between the hocks and the fitting of the separator between the ankles is automatic, which is but one advantageous feature of the present invention relative to known trussing devices. For another example, the tab relatively easily slips behind the hock to the ankle to secure the hock within the invention.

These features, and other features and advantages of the present invention, will become more apparent to those of ordinary skill in the relevant art when the following detailed description of the preferred embodiments is read in conjunction with the appended drawings in which like reference numerals represent like components throughout the several views.

DETAILED DESCRIPTION OF THE INVENTION

Figure 1:
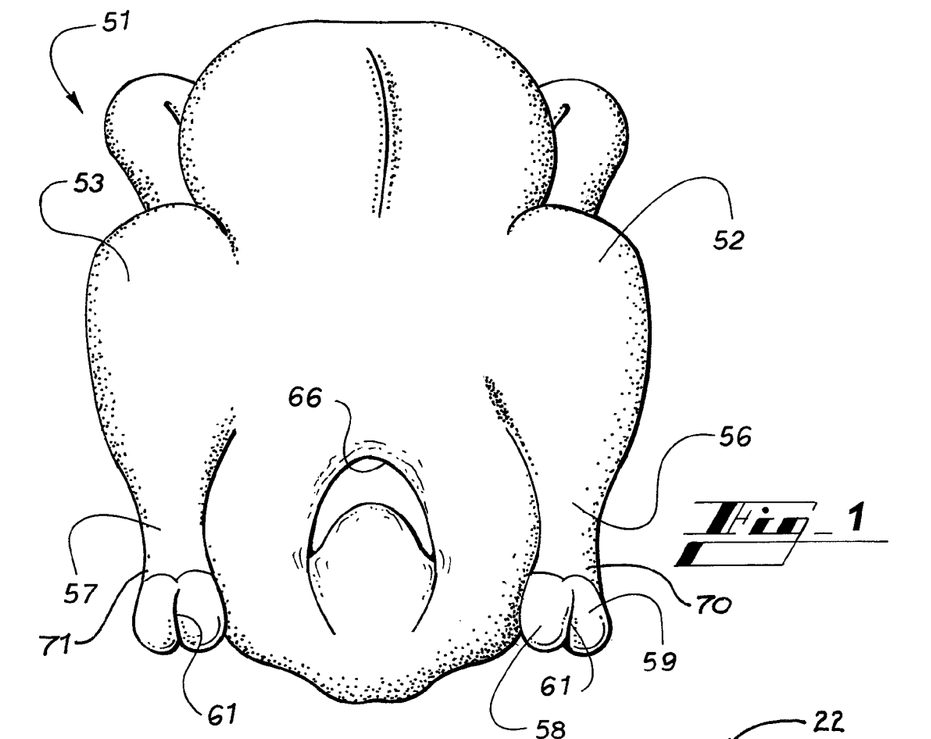
FIG. 1 is a perspective view of a typical eviscerated poultry carcass as often viewed by the consumer.
Figure 2:
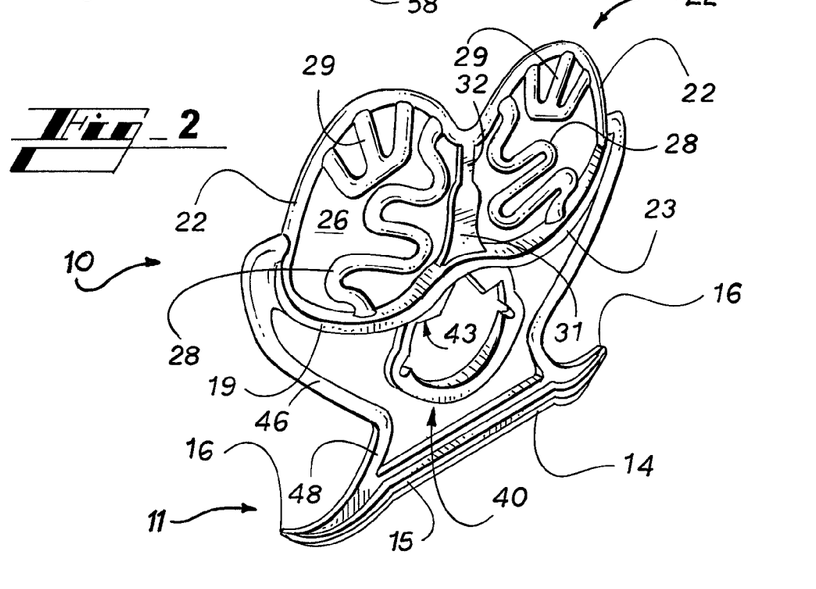
FIG. 2 is a perspective view of an embodiment of the retainer of the present invention.
Figure 3:
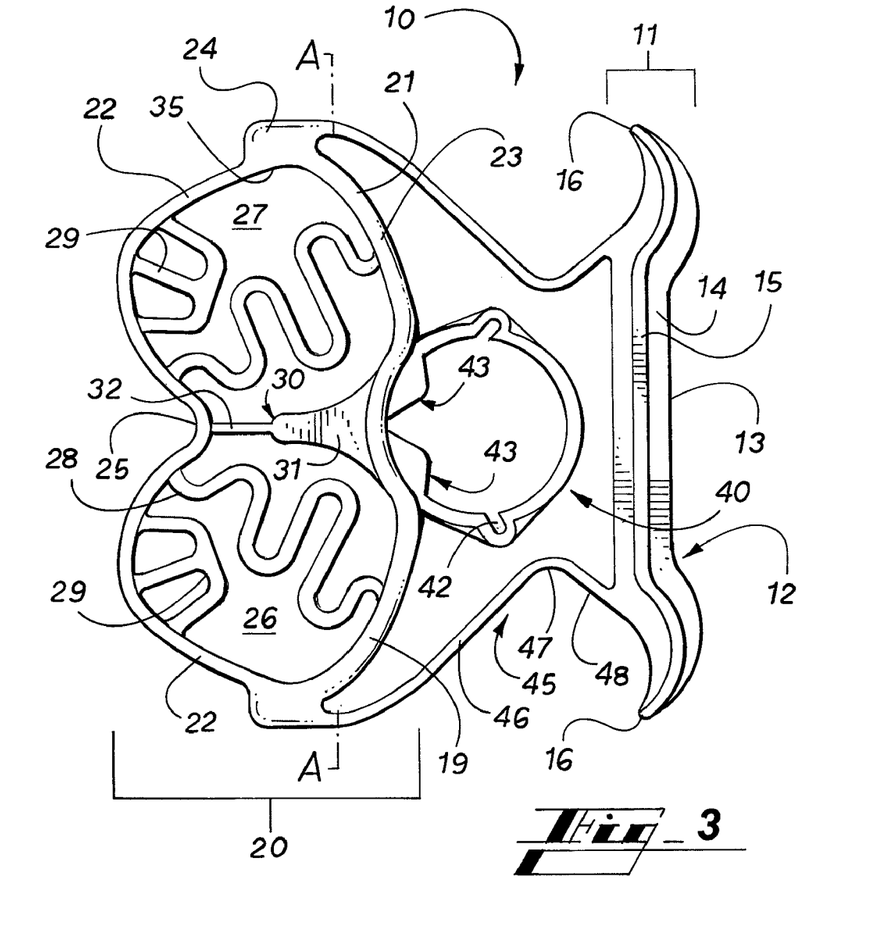
FIG. 3 is a front view of the retainer of FIG. 2.
Figure 4:
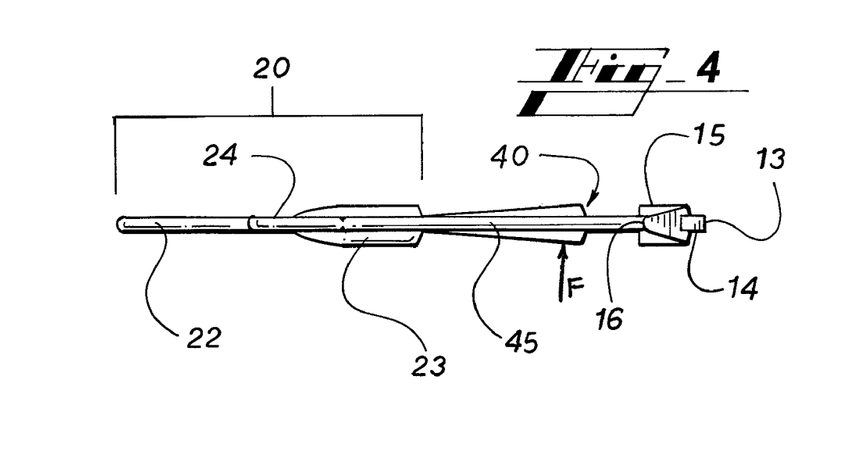
FIG. 4 is a side view of the retainer of FIGS. 2 and 3.
Figure 5:
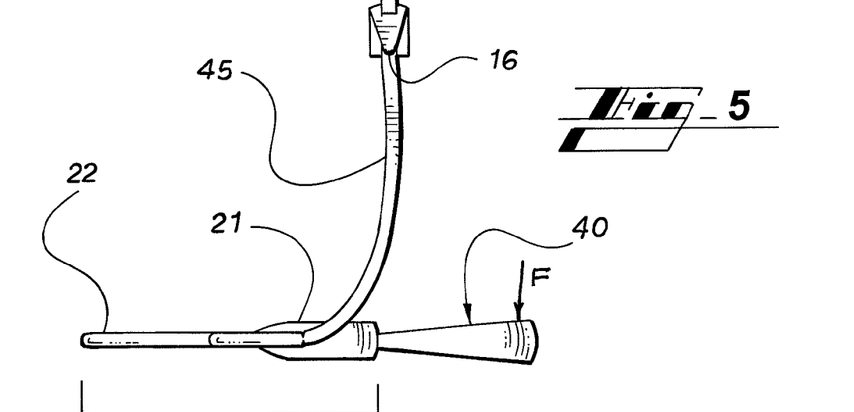
FIG. 5 is a side view of the retainer illustrating flexure of the bridle portion about axis A of FIG. 3.
Figure 6:
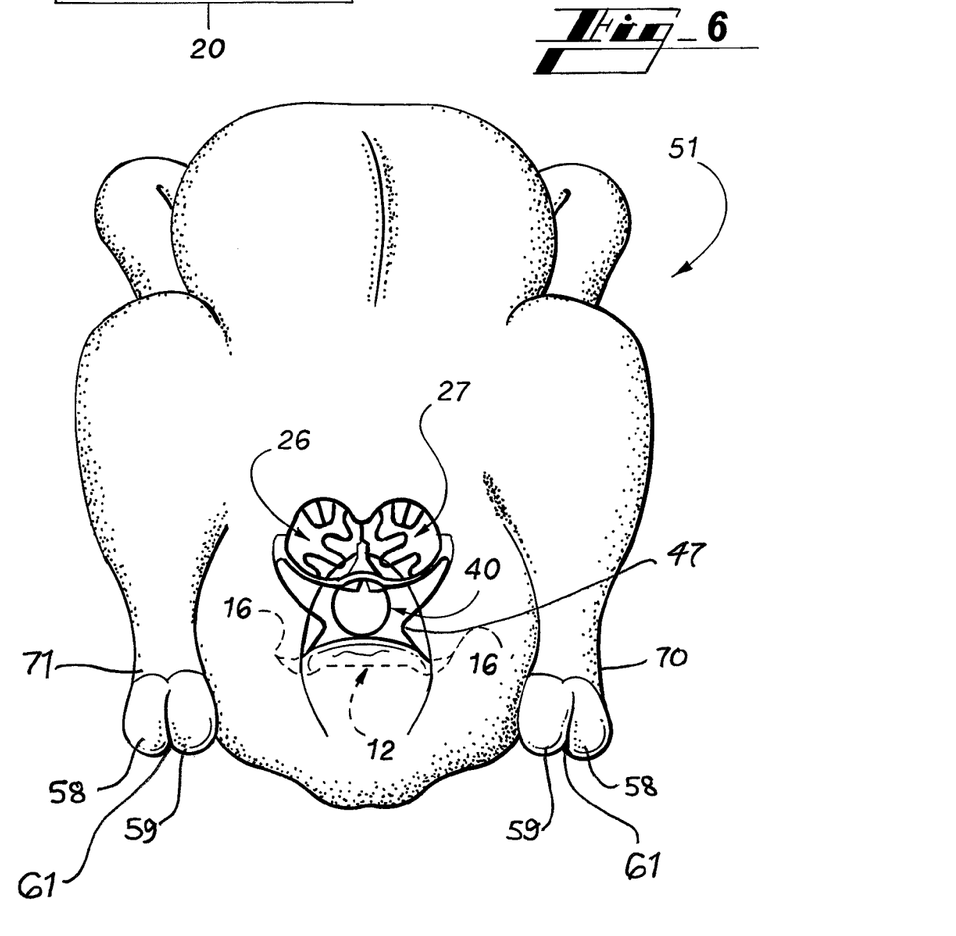
FIG. 6 is a pre-application view of the retainer inserted into the cavity of an eviscerated poultry carcass.
Figure 7:
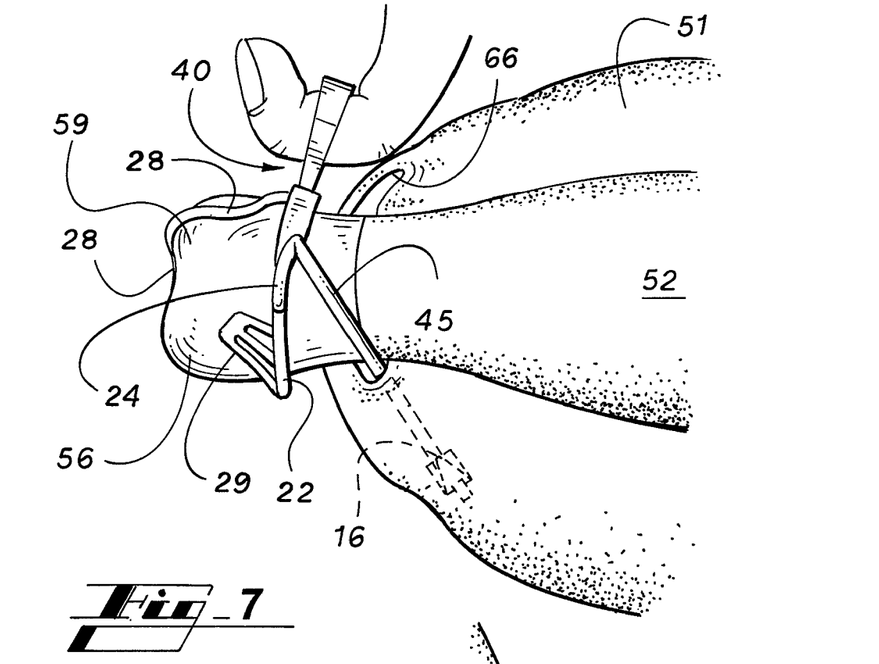
FIG. 7 is a during application view of the retainer relative to an eviscerated poultry carcass.
Figure 8:
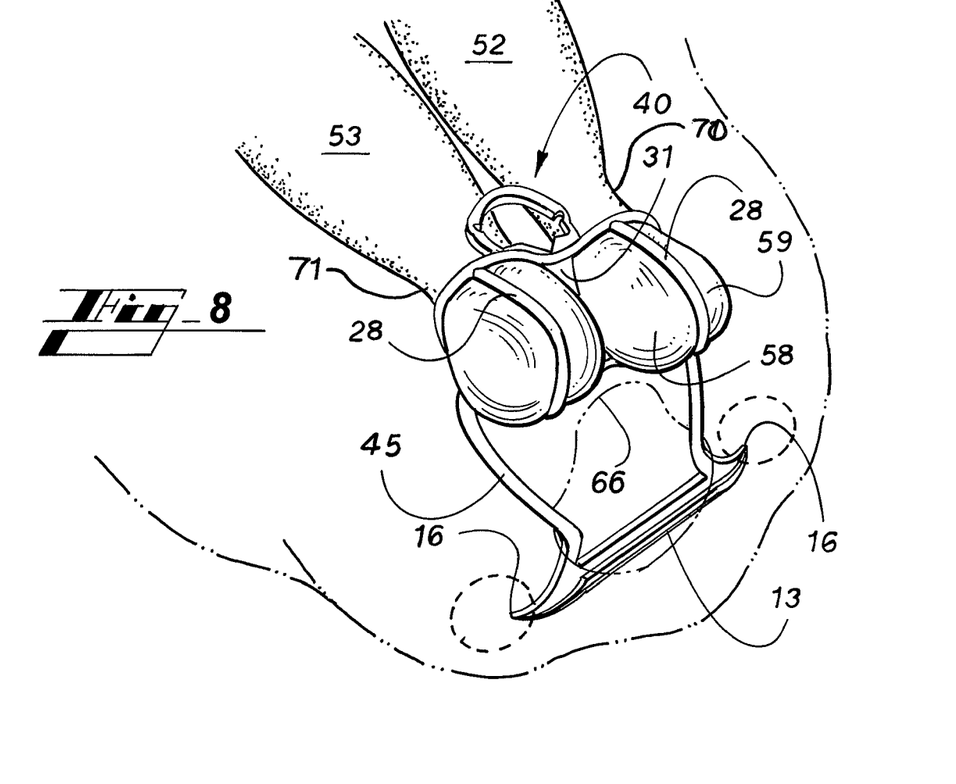
FIG. 8 is a post-application view of the retainer securing the hocks of an eviscerated poultry carcass.

The present invention provides an improved retainer or trussing device for the legs of eviscerated poultry. The improved retainer of the present can enhance trussing efficiency by as much as 4% or more over prior art trussing devices. The present invention is preferably formed as a single integral unit of nylon, plastic or the like which may be readily produced by standard plastic injection molding techniques. FIG. 1 is a perspective view of a typical eviscerated poultry carcass as often viewed by the consumer. FIG. 2 is a perspective view, FIG. 3 is a front view, and FIG. 4 is a side view of an embodiment of the retainer of the present invention. FIG. 5 is a side view of the retainer illustrating flexure of the bridle portion about axis A of FIG. 3. FIGS. 6 through 8 illustrate a pre-application, during application view, and post-application view, respectively, of the retainer securing the hocks of an eviscerated poultry carcass.

FIG. 1 is a perspective view of an eviscerated poultry carcass 51 with an open abdominal cavity 66. The illustration shows the eviscerated poultry carcass 51 having legs 52, 53 with the feet removed, terminating in exposed hocks 56, 57, respectively. This view is with legs 52, 53 pointing downward and the breast at the top of the drawing. On a poultry processing line, carcass 51 generally is transported hanging from hocks 56, 57 with legs 52, 53 pointing upward and the breast hanging downward.

FIG. 2 is a perspective view of an embodiment of the retainer of the present invention. Retainer 10 of the present invention has an anchor 11 portion for anchoring retainer 10 into cavity 66 of eviscerated bird 51, and hock retaining means or bridle 20 portion that is designed to hold together exposed hocks 56, 57 of carcass 51 of FIG. 1, which can be particularly advantageous during processing, packaging, shipping, storing, and/or cooking.

FIGS. 3 and 4 illustrate an embodiment of retainer 10 including bridle 20 and anchor 11, which are connected to each other by a pair of resiliently extensible legs 45. Bridle 20 comprises spar 21 defining a lower portion of bridle 20, curvilinear upper strip or member 22 defining an upper portion of bridle 20, with member 22 having downturned ends that merge into opposed upturned ends of spar 21. Preferably, spar 21 comprises ridge 23 and joining plates 24 disposed at the opposed upturned ends of spar 21. Ridge 23 can have rib 19 that extends along front and rear surfaces of ridge 23 and terminates proximal to upwardly turned ends 35 on joining plates 24 to provide reinforcement and controlled resiliency of spar 21, relative to member 22. That is, member 22 preferably is more resilient than spar 21. When considered in combination with the differences in a narrower portion 32 of separator 30, the upper portion of bridle 20, primarily member 22, is more resilient than the lower portion of bridle 20, primarily ridge 23.

Separator 30 is attached at a midpoint of ridge 23 and extends to attach to a midpoint of upper member 22, preferably at depression or valley 25 formed by a curvature of upper member 22 inwardly towards spar 21. The midpoints of spar 21 and ridge 23 generally are located at a midpoint between joining plates 24. Separator 30 divides bridle 20 into left and right receiving openings or loops 26, 27, such that member 22, spar 21, and separator 25 generally resemble an eyeglass frame. Separator 30 can have a broader portion at its base 31 adjacent spar 21, and a narrower portion 32 at its upper end, adjacent upper member 22.

Within each loop 26, 27, bridle 20 also includes a extensible strap 28 extending between upper member 22 and spar 21, and merging into spar 21 between the respective joining plate 35 and separator 30. Straps 28 are formed with a convoluted or serpentine configuration in the plane of FIG. 3 typically as mirror images of each other and each includes a number of bends, so that straps 28 are capable of resilient elongation by straightening the curved portions thereof. The purpose of this convoluted configuration is disclosed in more detail below.

Each loop 26, 27 further includes tab 29 projecting inwardly from upper member 22 into the interior of each loop 26, 27. Preferably tab 29 is located along member 22 between the junction of strap 28 and member 22 and joining plate 24 and generally in the plane of FIG. 3. Tab 29 may be formed as a unitary plate, or by a plurality of fingers interconnected at their distal ends by a tab edge, the latter of which is shown in the drawings, and which represents a material savings over a unitary plate. Tab 29 facilitates engagement of hocks 56, 57 with straps 28 by guiding hocks 56, 57 into engagement with straps 28 as hocks 56, 57 are inserted into loops 26, 27. Tab 29 also guides hocks 56, 57 into engagement with the base 31 of separator 30 which assists in retaining legs 52, 53 in position. Once hocks 56, 57 have been received into loops 26, 27, as described below, tabs 29 slip behind hocks 56, 57 to ankles 70, 71 and assist in retaining hocks 56, 57 in bridle 20.

Appendage 40, such as a ring, in the plane of FIG. 3 is disposed centrally beneath bridle 20 and attached to spar 21. As may be seen in reference to FIG. 5, application of a force F against appendage 40 (or spar 21) permits rotation of bridle 20 as a planar body about axis A. If appendage 40 is defined as a ring to form a finger hold for gripping and manipulating retainer 10 during application and removal of retainer 10 from legs 52, 53, one or more stiffeners 43 adjacent to spar 21 can be provided to reinforce ring appendage 40. Stiffeners 43 may be formed as a unitary plate or a pair of plates, as illustrated, in order to prevent collapse of ring appendage 40 and maintain a substantially planar relation to ridge 23 when pulling on ring appendage 40 during insertion and/or removal of retainer 10 in a bird. Ring appendage 40 also may have a pair of slots 42 at opposite sides thereof to serve as indexing means for stacking or manipulating retainers 10 in a predetermined orientation, such as in a holder located near a poultry processing worker, or in a magazine that feeds retainer 10 to automated poultry processing equipment.

Plates 24 serve as the connecting components between extensible legs 45 and bridle 20. Although extensible legs 45 can connect directly to the side of bridle 20 created at the convergence of spar 21 and upper member 22, proximal to upwardly turned end 35, the use of additional material in the form of plates 24 adds strength to the retainer 10 at a point where flexing and tensioning occurs. Specifically, as bridle 20 is rotated about axis A and pulled away from anchor 11 during the process of trussing legs 52, 53, rotational and tensional strain is placed on the connection between extensible legs 45 and bridle 20. Plates 45 assist in coping with this strain.

Extensible legs 45 connecting bridle 20 to anchor 11 can have inwardly inclined portions 46 that extend toward each other below bridle 20 and then outwardly into engagement with anchor beam 12 to form a V-shaped knee or flexible joint 47. The lower or outwardly inclined portions 48 of extensible legs 45 also may have an increased or larger cross section to prevent bending of same so that the rigid lower portions improve the gripping action of anchor beam 12. Extensible legs 45 may be resiliently extended at knee 47 to assist in extending bridle 20 when attaching retainer 10 to hocks 56, 57. Further, the V-shape of knee 47 better conforms to the shape of the bird, specifically the narrower gap between extensible legs 45 correspond with the opening of cavity 66.

Anchor beam 12 is substantially inflexible, or at least relatively inflexible when compared to upper member 22 and extensible legs 45. Anchor beam 12 is formed of a straight central portion 13 including a generally rectangular plate 14 with reinforcing ribs 15 along the top and bottom sides thereof. Outer ends 16 of anchor beam 12 are arcuate extensions of central portion 13 and each has an arcuate upper indentation. Ribs 15 can extend along the arcuate surfaces along outer ends 16, as illustrated in FIG. 3. As discussed herein, outer ends 16 cooperate with the interior of eviscerated carcass 51, typically in the kidney cavities (FIG. 8) or the ribs (not shown), to anchor retainer 10 within cavity 66.

FIG. 6 illustrates of an eviscerated carcass 51 of a turkey, for example, having legs 52, 53 engaged by retainer 10. Retainer 10 is intended for use with an eviscerated carcass 51 such as a turkey, chicken, or the like, and is employed to retain the legs 52, 53 of such fowl tightly against the bird's body. Preferably, retainer 10 extends over the rear body opening with hocks 56, 57 of legs 52, 53 pressed together. Carcass 51 has the feet and lower legs removed at hocks 56, 57 of legs 52, 53. Hocks 56, 57 are larger in cross-section (diameter) than the leg bones immediately behind hocks 56, 57 (ankles 70, 71) and each include a pair of knuckles 58, 59 with crease or cleft 61 between knuckles 58, 59. With legs 52, 53 drawn tightly against carcass 51 at the rear end thereof, hock knuckle creases 61 will be seen to be somewhat inclined with respect to vertical.

Application of retainer 10 to a bird is first carried out by inserting anchor beam 12 of retainer 10 preferably into the kidney holes adjacent the backbone of the bird 51 through a rear body opening into cavity 66. Retainer 10 is titled and one outer end 16 of anchor beam 12 is inserted into one of the kidney holes of the back structure of the bird 51. It will be appreciated that access to the backbone structure or the like is achieved through the rear body opening into cavity 66 after the bird 51 has been eviscerated. Following insertion of an outer end 16 of anchor beam 12 in a kidney opening, retainer 10 then is moved substantially as far as possible toward that kidney opening wherein one entire outer end 16 of anchor beam 12 extends through such opening. It will be appreciated that the V-shaped portion of extensible legs 45 allow for movement of retainer 10 sufficiently into the kidney hole such that the other outer end 16 of anchor beam 12 may then be pivoted downwardly past the bone structure of the backbone so as to align the other outer end 16 of anchor beam 12 with the opposite kidney opening. Retainer 10 is then moved so other outer end 16 extends through the other kidney opening. In this position, retainer 10 is fully inserted, as illustrated in FIG. 8, wherein it will be seen that retainer 10 is firmly engaged with the backbone structure of the bird 51. This provides a very secure anchor for retainer 10 so that bridle 20 may be affixed about hocks 56, 57 to tightly truss the same against the body of the bird 51 in close relation to the rear body opening 66. Alternatively, anchor beam 12 also may be secured to the internal portion of the carcass 51 such as in the rib section.

FIG. 6 shows the present invention in a pre-application state. More specifically, FIG. 6 illustrates retainer 10 anchored within cavity 66. As can be seen, anchor beam 12 is anchored within cavity 66. Extensible legs 45 extend outward from cavity 66 with V-shaped knee 47 cooperating with the body components of carcass 51 corresponding to the opening of cavity 66. Bridle 20 remains outside of the carcass 51.

FIG. 7 shows the present invention in a during application state. More specifically, bridle 20 has been pivoted about joining plates 24, causing a twist in the connection between extensible legs 45 and plates 24. As the material of retainer 10 has an elastic quality, bridle 20 desires to return to its untwisted position. Thus, because this twisted position is not the position of manufacture, retainer 10 is urged by such twisting deformation to its original flat position, and when retainer 10 is placed on hocks 56, 57, this urging forces hocks 56, 57 to maintain their position against carcass 51 and in juxtaposition to each other. Once hocks 56, 57 are substantially within loops 26, 27, bridle 20 will attempt to return to its original positions and, as it is prevented from doing so by the presence of legs 52, 53, bridle 20 keeps hocks 56, 57 and thereby legs 52, 53 in constant force and thereby held against carcass 51. Further, extensible legs 45 act like a spring and such that if a sudden jolt forces legs 52, 53 to rise, extensible legs 45 will react like a spring, thus providing a force to legs 52, 53 to return them to their original, proximal positioning. Such a system is particularly useful in the processing of poultry in which carcasses are tumbled in a spin chill to cool the poultry and unconstrained legs are apt to become damaged.

Reinforcing rib 19 of spar 21 will permit bridle 20 to tilt in a generally planar relation about axis A shown in FIGS. 3 and 5, as the relatively thinner extensible legs 45 will flex adjacent to joining plates 24. Bridle 20 is pulled generally away from carcass 51 and legs 52, 53 are brought inwards, typically one at a time, over extensible legs 45. Hocks 56, 57 then are inserted, preferably individually, within loops 26, 27, respectively. In this manner, spar 21 of upper member 22 can be readily positioned along a line generally above and behind hocks 56, 57 such that tabs 29 urge hocks 56, 57 into engagement with straps 28 as hocks 56, 57 are pressed into loops 26, 27. Straps 28 stretch to extend along creases 61 between knuckles 58, 59. Unlike in current trussing devices in which the separator must be independently manipulated between the hocks, due to the structural configuration of the present invention, separator 30 slides between hocks 56, 57, with broader portion 31 assisting in keeping hocks 56, 57 juxtaposed yet separate from each other.

As hocks 56, 57 slide into loops 26, 27, tabs 29 slip behind hocks 26, 27 to ankles 70, 71 such that tabs 29 engage hocks 56, 57 from behind knuckles 58, 59 to assist in retaining hocks 56, 57 in their respective loops 26, 27. It will be seen that upper member 22 encircles hocks 56, 57 across the bottom and sides thereof to resiliently pull hocks 56, 57 together into the position shown in FIG. 8 with spar 21 extending above and behind knuckles 58, 59 so that hocks 56, 57 are retained in the position illustrated, and hold legs 52, 53 tightly against the body of the bird preferably across the rear body opening 66. Separator 30 thus is disposed between respective separate legs 52, 53 and is seated in proper position by resilient deformation of other portions of retainer 10 so as to prevent possible movement of legs 52, 53. Release of appendage 40 further permit base 31 of separator 20 to be further drawn between hocks 56, 57 to position spar 21 above and behind knuckles 58, 59.

It will be appreciated that the ability of bridle 20 to pivot about axis A in a planar orientation, in combination with the relative flexibility of the upper portion of bridle 20 relative to spar 21 at the lower portion of bridle 20, represents a distinct advantage of the invention. This configuration permits spar 21 to be readily positioned above and behind hocks 56, 57 so that the hocks 56, 57 may be captured or lassoed by bridle 20 as spar 21 is drawn downward under resilient tension of retainer 10 into position above and behind hocks 56, 57, thus forcing legs 52, 53 downward against carcass 51. Concurrently, upper member 22 remains below and behind hocks 56, 57 to assist in retaining hocks 56, 57 within loops 26, 27. FIG. 8 illustrates a properly trussed carcass 51.

Preceding this attachment of retainer 10 to legs 52, 53, the bird's tail is preferably folded up under legs 52, 53 and across rear body opening to cavity 66 to thus at least partly seal rear body opening to cavity 66 by pressure of retained legs 52, 53 thereon. Alternatively, owing to the resiliency of retainer 10 elements, the tail may be tucked under legs 52, 53 subsequent to their securement in bridle 20. The trussed bird is then in condition for further processing or sale. Such further processing often includes freezing of the bird and packaging of same by a transparent polymer skin or cover tightly molded to the exterior of the bird. The trussed condition of legs 52, 53 in the above described position with the tail tucked thereunder provides a relatively smooth configuration that is well adapted to receive a plastic wrapper or the like. In use the wrapper is removed by the cook and after defrosting of a frozen bird the tail may be removed from the illustrated position of FIG. 8 for stuffing the bird and then again tucked under legs 52, 53 to seal the rear body opening to retain stuffing or filling within body cavity 66 of the bird.

Retainer 10 also may be conveniently removed for stuffing the bird and subsequently reattached for cooking. To remove retainer 10, the user may simply grasp appendage 40 and pull upwards such that bridle 20 will flex, as previously described, and release spar 21 from behind the hock knuckles 58, 59, thereby releasing legs 52, 53 from bridle 20.

As briefly noted above, certain steps in the processing of poultry may result in the trussed bird striking processing elements or being struck thereby, and such blows may occur to the trussed legs 52, 53 as, for example, at the hocks 56, 57 thereof. Any such blow will have a tendency to force one of legs 52, 53 inwardly of the other leg 53, 52 toward the body of the bird and this can cause one of legs 52, 53 to become unseated from retainer 10. The present invention, however, prevents this possibility by means of the tabs 29 and separator 30, which resiliently engage hocks 56, 57 therebetween, particularly the widened portion of separator base 31. Consequently hocks 56, 57 are firmly locked and maintained in their retained position despite blows that may strike hocks 56, 57. The types of blows that the trussed bird may receive typically will not unseat retainer 10. Thus retainer 10 of the present invention provides a material improvement over prior art retainers. Moreover, the improved features of retainer 10 enhance the efficiency of trussing hocks 56, 57 during poultry processing operations.

Thus, one preferred embodiment of the invention is a poultry leg retainer for use with a poultry carcass having legs with hocks, the retainer comprising a bridle having a resiliently flexible upper member connected at opposed ends of and to a lower semi rigid spar, a separator interconnecting the upper member and the spar at midpoints thereof, the upper member, spar, and separator defining a pair of loops adapted to receive the hocks; extensible straps attached at a first end to the upper member and at a second end to the spar and extending generally across each of the loops, the extensible straps adapted to cooperate with knuckle creases on the hocks; tabs projecting from the upper member inwardly into each of the loops, the tabs for cooperating with the hocks so as to assist in retaining the hocks within the loops; and an anchor having upturned ends adapted for engagement with an interior cavity of the poultry carcass, the anchor connected by legs in depending relation to the bridle, wherein the bridle and extensible straps form a basket structure for retaining the hocks and wherein the bridle is elastically rotatably connected to the legs such that the bridle can be rotated from a first position for placement of the hocks within the basket structure and the elastic quality urges the bridle back towards the first position whereby the legs are trussed against the poultry carcass.

In another preferred embodiment, the separator comprises a first narrower portion and a second broader portion for separating and retaining the hocks in a desired position, whereby the structure of the separator in combination with the structure of the retainer cause the separator to slide between the hocks without manual manipulation.

In yet another preferred embodiment, the tab is located along the upper member between the first end and the second end of the extensible strap. The tab can comprises a plurality of resilient fingers interconnected by a tab edge. The tabs can be attached to an outwardly arcuate portion of the upper member, which structure allows for an inwardly bending of the tabs and the arcuate portion of the upper member towards the hocks so as to better cooperate with the legs and the hocks for retaining the hocks within the retainer.

Another preferred embodiment of the invention is a poultry leg retainer for use with a poultry carcass having legs with hocks, the retainer comprising a pivotable bridle having a resiliently flexible upper member connected at opposed ends of and to a lower semi rigid spar, a separator interconnecting the upper member and the spar at midpoints thereof, the upper member, spar, and separator defining a pair of loops adapted to receive the hocks, wherein the separator comprises a first narrower portion and a second broader portion for separating and retaining the hocks in a desired position, whereby the structure of the separator in combination with the structure of the retainer cause the separator to slide between the hocks without manual manipulation; extensible straps attached at a first end to the upper member and at a second end to the spar and extending generally across each of the loops, the extensible straps adapted to cooperate with knuckle creases on the hocks; tabs projecting from the upper member inwardly into each of the loops, the tabs for cooperating with the hocks so as to assist in retaining the hocks within the loops, wherein the tabs are located along the upper member between the first end and the second end of the extensible strap and the tabs are attached to an outwardly arcuate portion of the upper member and the tabs comprise a plurality of resilient fingers interconnected by a tab edge, which structure allows for an inwardly bending of the tabs and the arcuate portion of the upper member towards the hocks so as to better cooperate with the legs and the hocks for retaining the hocks within the retainer; and an anchor having upturned ends adapted for engagement with an interior cavity of the poultry carcass, the anchor connected by legs in depending relation to the bridle, wherein the bridle and extensible straps form a basket structure for retaining the hocks and wherein the bridle is elastically rotatably connected to the legs such that the bridle can be rotated from a first position for placement of the hocks within the basket structure and the elastic quality urges the bridle back towards the first position whereby the legs are trussed against the poultry carcass The relatively simple structure of retainer 10 can allow it to be manufactured relatively easily with inexpensive materials. Preferably, retainer 10 can be molded from a single piece of resilient material that can withstand cooking and processing temperatures (which can approach and exceed 500 degree F.). Retainer 10 can be formed of plastic or other resilient material that permits it to deflect and resume its original shape. Such plastics and other materials are evident to and known by those of skill in the art. In operation, the trussing device of this invention may be applied to the carcasses as quickly and easily as any device presently on the market. The trussing device of the present invention affords a positive and secure mechanism to hold the hocks together.

The preferred material for the present invention is nylon with a thickness of up to approximately 0.30 inches, and preferably between 0.03 and 0.15 inches. This thickness range provides sufficient rigidity for retainer 10 while permitting the resilient components of retainer 10 to be adequately deformable via their narrow cross-section. Plastics and other polymers also are suitable and can be selected by those of ordinary skill in the art based on the use of retainer 10. For example, a high melting temperature material can be used for retainers 10 intended for use in cooking, while low melting temperature materials can be used for retainers 10 intended only for packaging and display. Further, the structure of the present invention allows the use of less material than prior art trussing devices, saving on material costs and disposal costs and bulk.

The foregoing detailed description of the preferred embodiments and the appended figures have been presented only for illustrative and descriptive purposes. They are not intended to be exhaustive and are not intended to limit the scope and spirit of the invention. The embodiments were selected and described to best explain the principles of the invention and its practical applications. One skilled in the art will recognize that many variations can be made to the invention disclosed in this specification without departing from the scope and spirit of the invention.

What is claimed is:

1. A poultry leg retainer for use with a poultry carcass having legs with hocks, the retainer comprising:
   a) a bridle having a resiliently flexible upper member connected at opposed ends of and to a lower semi rigid spar, a separator interconnecting the upper member and the spar at midpoints thereof, the upper member, spar, and separator defining a pair of loops adapted to receive the hocks;
   b) extensible straps attached at a first end to the upper member and at a second end to the spar and extending generally across each of the loops, the extensible straps adapted to cooperate with knuckle creases on the hocks;
   c) tabs projecting from the upper member inwardly into each of the loops, the tabs for cooperating with the hocks so as to assist in retaining the hocks within the loops; and
   d) an anchor having upturned ends adapted for engagement with an interior cavity of the poultry carcass, the anchor connected by legs in depending relation to the bridle,
   wherein the bridle and extensible straps form a basket structure for retaining the hocks and wherein the bridle is elastically rotatably connected to the legs such that the bridle can be rotated from a first position for placement of the hocks within the basket structure and the elastic quality urges the bridle back towards the first position whereby the legs are trussed against the poultry carcass.

2. The retainer of claim 1, wherein the separator comprises a first narrower portion and a second broader portion for separating and retaining the hocks in a desired position, whereby the structure of the separator in combination with the structure of the retainer cause the separator to slide between the hocks without manual manipulation.

3. The retainer of claim 1, wherein the tabs are located along the upper member between the first end and the second end of the extensible strap.

4. The retainer of claim 3, wherein the tabs comprise a plurality of resilient fingers interconnected by a tab edge.

5. The retainer of claim 4, wherein the tabs are attached to an outwardly arcuate portion of the upper member, which structure allows for an inwardly bending of the tabs and the arcuate portion of the upper member towards the hocks so as to better cooperate with the legs and the hocks for retaining the hocks within the retainer.

6. The retainer of claim 3, wherein the tab comprises a resilient flat plate.

7. The retainer of claim 1, further comprising an appendage in depending relation to the spar.

8. The retainer of claim 7, wherein the appendage is a ring.

9. The retainer of claim 1, wherein the bridle pivots as a substantially planar body about a connection between the depending legs and ends of the spar.

10. A poultry leg retainer for use with a poultry carcass having legs with hocks, the retainer comprising:

a) a pivotable bridle having a resiliently flexible upper member connected at opposed ends of and to a lower semi rigid spar, a separator interconnecting the upper member and the spar at midpoints thereof, the upper member, spar, and separator defining a pair of loops adapted to receive the hocks, wherein the separator comprises a first narrower portion and a second broader portion for separating and retaining the hocks in a desired position, whereby the structure of the separator in combination with the structure of the retainer cause the separator to slide between the hocks without manual manipulation;

b) extensible straps attached at a first end to the upper member and at a second end to the spar and extending generally across each of the loops, the extensible straps adapted to cooperate with knuckle creases on the hocks;

c) tabs projecting from the upper member inwardly into each of the loops, the tabs for cooperating with the hocks so as to assist in retaining the hocks within the loops, wherein the tabs are located along the upper member between the first end and the second end of the extensible strap and the tabs are attached to an outwardly arcuate portion of the upper member and the tabs comprise a plurality of resilient fingers interconnected by a tab edge, which structure allows for an inwardly bending of the tabs and the arcuate portion of the upper member towards the hocks so as to better cooperate with the legs and the hocks for retaining the hocks within the retainer; and d) an anchor having upturned ends adapted for engagement with an interior cavity of the poultry carcass, the anchor connected by legs in depending relation to the bridle, wherein the bridle and extensible straps form a basket structure for retaining the hocks and wherein the bridle is elastically rotatably connected to the legs such that the bridle can be rotated from a first position for placement of the hocks within the basket structure and the elastic quality urges the bridle back towards the first position whereby the legs are trussed against the poultry carcass.

11. The retainer of claim 10, wherein the bridle pivots as a substantially planar body about a connection between the depending legs and ends of the spar.

12. The retainer of claim 11, further comprising an appendage in depending relation to the spar.

13. The retainer of claim 12, wherein the appendage is a ring.

* * * * *